(12) United States Patent
Takasu

(10) Patent No.: US 11,199,487 B2
(45) Date of Patent: Dec. 14, 2021

(54) INFORMATION PROCESSING SYSTEM

(71) Applicant: FUJITSU LIMITED, Kawasaki (JP)

(72) Inventor: Ryozo Takasu, Isehara (JP)

(73) Assignee: FUJITSU LIMITED, Kawasaki (JP)

( * ) Notice: Subject to any disclaimer, the term of this patent is extended or adjusted under 35 U.S.C. 154(b) by 146 days.

(21) Appl. No.: 16/655,964

(22) Filed: Oct. 17, 2019

(65) Prior Publication Data

US 2020/0049609 A1    Feb. 13, 2020

Related U.S. Application Data

(63) Continuation of application No. PCT/JP2018/012694, filed on Mar. 28, 2018.

(30) Foreign Application Priority Data

May 25, 2017 (JP) .............................. JP2017-103278

(51) Int. Cl.
*G01N 15/06* (2006.01)
*G06F 17/15* (2006.01)

(52) U.S. Cl.
CPC ............. *G01N 15/06* (2013.01); *G06F 17/15* (2013.01)

(58) Field of Classification Search
CPC . G01N 15/06; G01N 2015/0046; G06F 17/15
See application file for complete search history.

(56) References Cited

U.S. PATENT DOCUMENTS

| 6,055,052 A | 4/2000 | Lilienfeld |
| 2004/0069051 A1 | 4/2004 | Hotta et al. |
| 2007/0131038 A1 | 6/2007 | Wei et al. |
| 2007/0205736 A1* | 9/2007 | Lindberg ........... G01D 5/24476 318/490 |

(Continued)

FOREIGN PATENT DOCUMENTS

| CN | 105527208 A | 4/2016 |
| EP | 3214429 A1 | 5/2015 |
| JP | 2002-501182 A | 1/2002 |

(Continued)

OTHER PUBLICATIONS

Soneja et al., "Humidity and Gravimetric Equivalency Adjustments for Nephelometer-Based Particulate Matter Measurements of Emissions from Solid Biomass Fuel Use in Cookstoves", Int. J. Environ. Res. Public Health 2014, 11, 6400-6416 (Year: 2014).*

(Continued)

*Primary Examiner* — Regis J Betsch
(74) *Attorney, Agent, or Firm* — Fujitsu Patent Center

(57) ABSTRACT

An information processing apparatus includes: a memory; and a processor coupled to the memory and configured to: select, by referring to the memory that stores a plurality of correlations between a second mass concentration of particles in a gas and a second number concentration of the particles in the gas with respect to second humidity of the gas, two correlations from the plurality of correlations; and calculate a first mass concentration of particles in a gas based on the two correlations, a first number concentration of the particles in the gas measured by a first number concentration measuring instrument, and first humidity of the gas measured by a first hygrometer.

4 Claims, 9 Drawing Sheets

(56) References Cited

U.S. PATENT DOCUMENTS

| | | |
|---|---|---|
| 2016/0349168 A1 | 12/2016 | Takasu |
| 2017/0153213 A1 | 6/2017 | Takasu |

FOREIGN PATENT DOCUMENTS

| | | |
|---|---|---|
| JP | 2003-21611 A | 1/2003 |
| JP | 2006-3090 A | 1/2006 |
| JP | 2007-147519 A | 6/2007 |
| JP | 2009-518584 A | 5/2009 |
| JP | 2016-223907 A | 12/2016 |
| JP | 2017-96846 A | 6/2017 |
| WO | 2016/067484 A1 | 5/2016 |

OTHER PUBLICATIONS

Soneja et al., "Humidity and Gravimetric Equivalency Adjustments for Nephelometer-Based Particulate Matter Measurements of Emissions from Solid Biomass Fuel Use in Cookstoves", Int. J. Environ. Res. Public Health 2014 (Year: 2014).*

Watson et al., "Guidance for Using Continuous Monitors in PM2.5 Monitoring Networks", 1998 EPA document EPA-454/R-98-012 (Year: 1998).*

Wang, "Laboratory Evaluation and Calibration of Three Low-Cost Particle Sensors for Particulate Matter Measurement", Aerosol Science and Technology, 49:1063-1077, 2015 (Year: 2015).*

Yu et al., "Evaluation of Diesel Exhaust Continuous Monitors in Controlled Environmental Conditions", J Occup Environ Hyg. Sep. 2015 ; 12(9): 577-587 (Year: 2015).*

Hojaiji et al., "Temperature and Humidity Calibration of a Low-Cost Wireless Dust Sensor for Real-Time Monitoring", 2017 IEEE Sens Appl Symp (SAS) (2017) (Year: 2017).*

International Search Report and Written Opinion of the International Searching Authority, with Partial Translation (Form PCT/ISA/210,220, and 237), mailed in connection with PCT/JP2018/012695 and dated Jun. 5, 2018. (10 pages).

Japanese Office Action dated Sep. 23, 2020 for corresponding Japanese Patent Application No. 2017-103278, with English Translation, 7 pages. Please note JP-2016-223907-A, JP-2003-21611-A and JP-2006-3090-A cited herewith, were previously cited in an IDS filed on Oct. 17, 2019.

International Search Report and Written Opinion of the International Searching Authority, with Partial Translation (Form PCT/ISA/210,220, and 237), mailed in connection with PCT/JP2018/012694 and dated Jun. 26, 2018. (9 pages).

Chinese Office Action dated Sep. 18, 2021 for corresponding Chinese Patent Application No. 201880027692.5, with English Translation, 17 pages.

* cited by examiner

INFORMATION PROCESSING SYSTEM

CROSS-REFERENCE TO RELATED APPLICATION

This application is a continuation application of International Application PCT/JP2018/012694 filed on Mar. 28, 2018 and designated the U.S., the entire contents of which are incorporated herein by reference. The International Application PCT/JP2018/012694 is based upon and claims the benefit of priority of the prior Japanese Patent Application No. 2017-103278, filed on May 25, 2017, the entire contents of which are incorporated herein by reference.

FIELD

The embodiment relates to a measurement apparatus and a measurement method.

BACKGROUND

In recent years, concentration measurement has been actively performed of a particulate matter such as PM2.5 in the air. As a unit of the concentration of particles in a gas, the mass of particles contained in a gas per unit volume is used (for example, $mg/m^3$ or $\mu g/m^3$). This particle concentration is referred to as a mass concentration. At present, PM2.5 concentration is expressed by the mass concentration.

Related art is disclosed in Japanese Laid-open Patent Publication No. 2006-3090 and Japanese Laid-open Patent Publication No. 2007-147519.

SUMMARY

According to an aspect of the embodiments, an information processing apparatus includes: a memory; and a processor coupled to the memory and configured to: select, by referring to the memory that stores a plurality of correlations between a second mass concentration of particles in a gas and a second number concentration of the particles in the gas with respect to second humidity of the gas, two correlations from the plurality of correlations; and calculate a first mass concentration of particles in a gas based on the two correlations, a first number concentration of the particles in the gas measured by a first number concentration measuring instrument, and first humidity of the gas measured by a first hygrometer.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
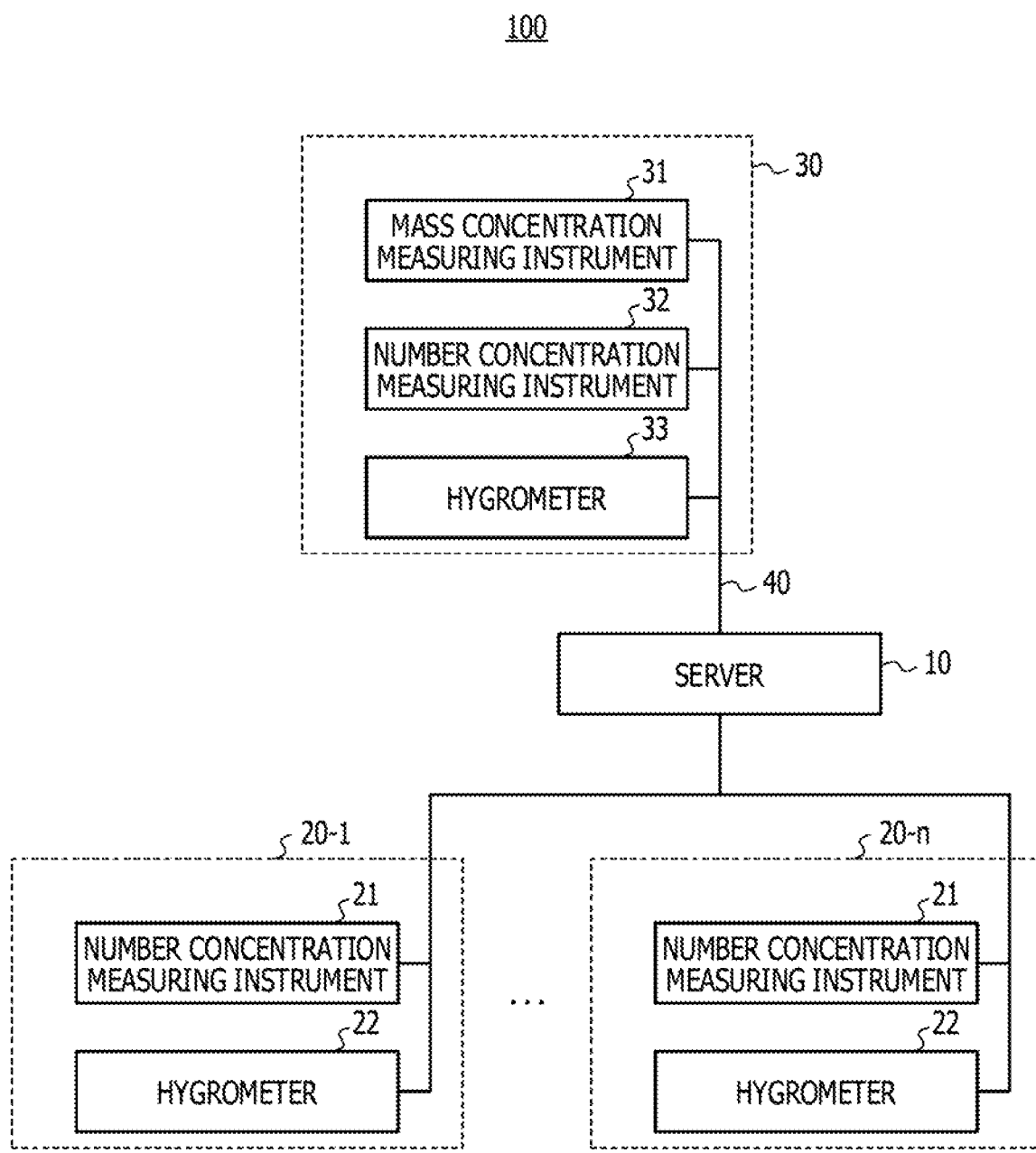
FIG. 1 is a block diagram illustrating a measurement system according to an embodiment.

Examples of a measurement method of the mass concentration of the particulate matter such as PM2.5 include a filter method for collecting particles in a gas into a filter and measuring the mass thereof. In addition, there is a beta ray attenuation method as a measurement method of the mass concentration capable of automatic measurement. The concentration obtained by the filter method or beta ray absorption method is the mass concentration.

On the other hand, as another measurement method of the particulate matter, there is a light scattering detection method for measuring the number of particles (for example, particles/$m^2$) in a gas per unit volume by scattered light obtained by irradiating particles in the gas with light.

Since the light scattering detection method is not a method of directly measuring the mass concentration, it may be necessary to obtain a conversion factor to the mass concentration and correct a detected value.

The measurement apparatus and measurement method aim to improve measurement accuracy of the mass concentration may be provided.

From a viewpoint of influence of PM2.5 and the like on health and the like, there is an increasing demand to measure a surrounding PM2.5 concentration at a high frequency. However, the number of measurement stations that measure PM2.5 concentration is less than 1000 in the whole country. In addition, installation locations are also uneven, and the above demand cannot be sufficiently addressed.

In addition, if the measurement stations are installed at a spatially high density, and the PM2.5 concentration is collected and distributed in real time, it will be helpful for coping when an increase in PM2.5 concentration is expected. In addition, it can contribute to prediction of PM2.5 concentration, identification of PM2.5 source, and/or atmospheric science simulation.

Since mass concentration measuring instruments using a filter method or beta ray absorption method are expensive, it is difficult to install measurement stations including a mass concentration detector all over the country. In addition, since the measurement time is long, real time measurement is difficult.

On the other hand, a number concentration measuring instrument using a light scattering detection method is considered to be suitable for the measurement of a surrounding environment since the number concentration measuring instrument is relatively inexpensive and is capable of measurement at short intervals.

However, a concentration that can be measured by the light scattering detection method is not a mass concentration, but a number concentration corresponding to the number of particles per unit volume. It is therefore necessary to convert the number concentration of particles in a gas to a mass concentration. One of conversion methods to the mass concentration is a method of multiplying the number concentration of particles in a gas by a constant conversion factor. However, conversion accuracy is not high with this method.

The inventor has succeeded in improving the conversion accuracy from the number concentration to the mass concentration by making the conversion factor a function of humidity. This is considered to be related to that a particle size distribution and a particle physicochemical property are converted due to a change in moisture absorption of the particles when humidity of a gas changes. The particles are a mixture of various components. Hygroscopicity of particles depends on components of the particles. For example, in a case where the particles are ammonium sulfate, in a humidity of 90%, a light scattering cross section is five times that in a dry state. In a case where the particles are organic substances, the light scattering cross section is less affected by humidity. Thus, when the components of the particles change, the hygroscopicity of the particles changes. The components of the particles change with places and times. For this reason, when the same function is used as a function to convert from the number concentration to the mass concentration, the conversion accuracy from the number concentration to the mass concentration cannot be made very high. It has therefore been conceived that a plurality of correlations between the mass concentration and the number concentration with respect to the humidity is prepared in advance by actual measurement and acquisition over a fixed period, and a function to convert from the number concentration to the mass concentration is calculated on the basis of two correlations selected from the plurality of correlations.

Hereinafter, an embodiment of a measurement system will be described in detail with reference to FIGS. 1 to 9.

FIG. 1 is a block diagram illustrating the measurement system according to the embodiment. As illustrated in FIG. 1, a measurement system 100 includes a representative measurement station 30, simple measurement stations 20-1 to 20-$n$ (n is an arbitrary positive integer), and a server 10. The server 10 is an example of a measurement apparatus. Note that, the simple measurement stations 20-1 to 20-$n$ have similar configurations, so that the stations will be described as a simple measurement station 20 unless it is necessary to distinguish them in the following description.

The representative measurement station 30 includes a mass concentration measuring instrument 31, a number concentration measuring instrument 32, and a hygrometer 33. The mass concentration measuring instrument 31 is, for example, a measuring instrument using a beta ray absorption method, and measures a mass concentration Cm0 of particles such as PM2.5 in a gas in the representative measurement station 30. The number concentration measuring instrument 32 is a measuring instrument using, for example, a light scattering detection method, and measures a number concentration Cn0 of the particles such as PM2.5 in the gas in the representative measurement station 30. The number concentration measuring instrument 32 is an example of a second number concentration measuring instrument. The hygrometer 33 measures humidity h0 of the gas in the representative measurement station 30. The hygrometer 33 is an example of a second hygrometer. The representative measurement station 30 is connected to the server 10 via a wired or wireless network 40 (for example, the Internet network).

The simple measurement station 20 includes a number concentration measuring instrument 21 and a hygrometer 22. The number concentration measuring instrument 21 is a measuring instrument using, for example, a light scattering detection method, and measures a number concentration Cn1 of particles such as PM2.5 in the gas in the simple measurement station 20. The number concentration measuring instrument 21 is an example of a first number concentration measuring instrument. The hygrometer 22 measures humidity h1 of the gas in the simple measurement station 20. The hygrometer 22 is an example of a first hygrometer. The simple measurement station 20 is connected to the server 10 via the network 40, and transmits, to the server 10, the number concentration and relative humidity respectively measured by the number concentration measuring instrument 21 and the hygrometer 22.

The server 10 calculates a mass concentration of particles such as PM2.5 in the simple measurement station 20 by using the number concentration and the humidity received from the simple measurement station 20.

Figure 2:
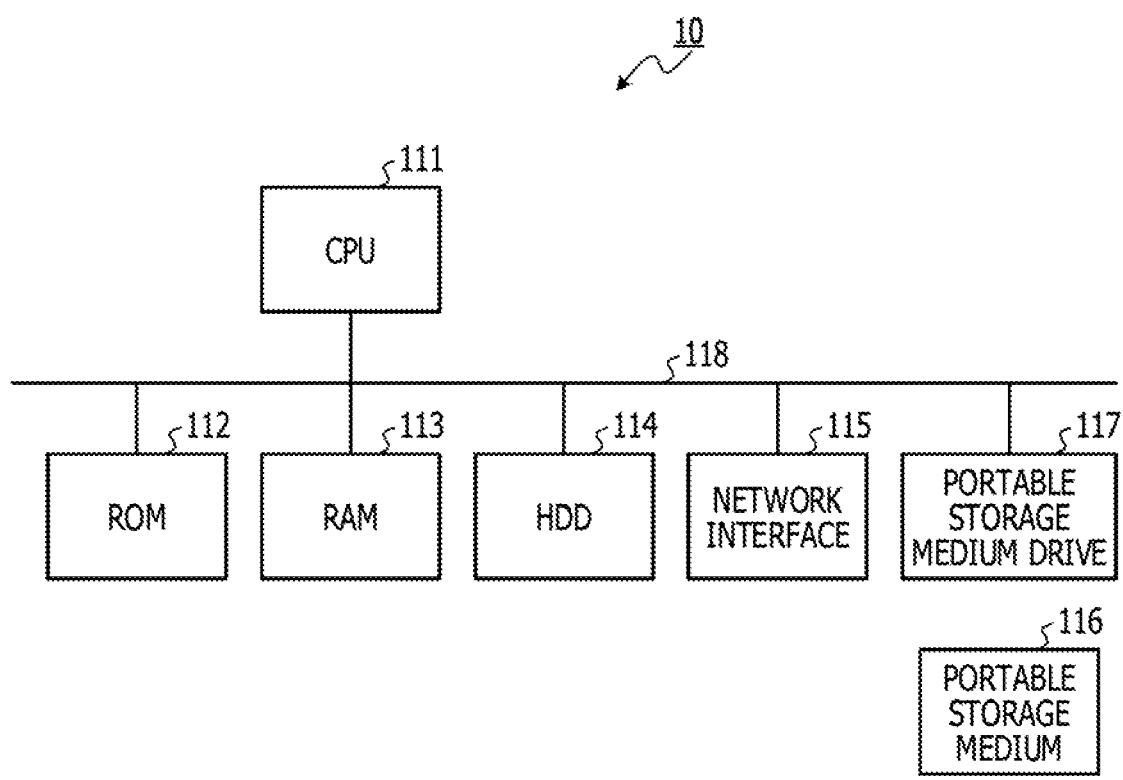
FIG. 2 is a diagram illustrating a hardware configuration of a server that functions as a measurement apparatus according to the embodiment.

The server 10 has a hardware configuration as illustrated in FIG. 2. Specifically, as illustrated in FIG. 2, the server 10 includes a central processing unit (CPU) 111, a read only memory (ROM) 112, a random access memory (RAM) 113, a storage device (hard disk drive (HDD)) 114, a network interface 115, a portable storage medium drive 117 capable of reading data stored in a portable storage medium 116, and the like. The components of the server 10 are connected to a bus 118. The CPU 111 causes the server 10 to function as each unit in FIG. 3 by executing a program stored in the ROM 112 or the HDD 114, or a program read by the portable storage medium drive 117 from the portable storage medium 116.

Figure 3:
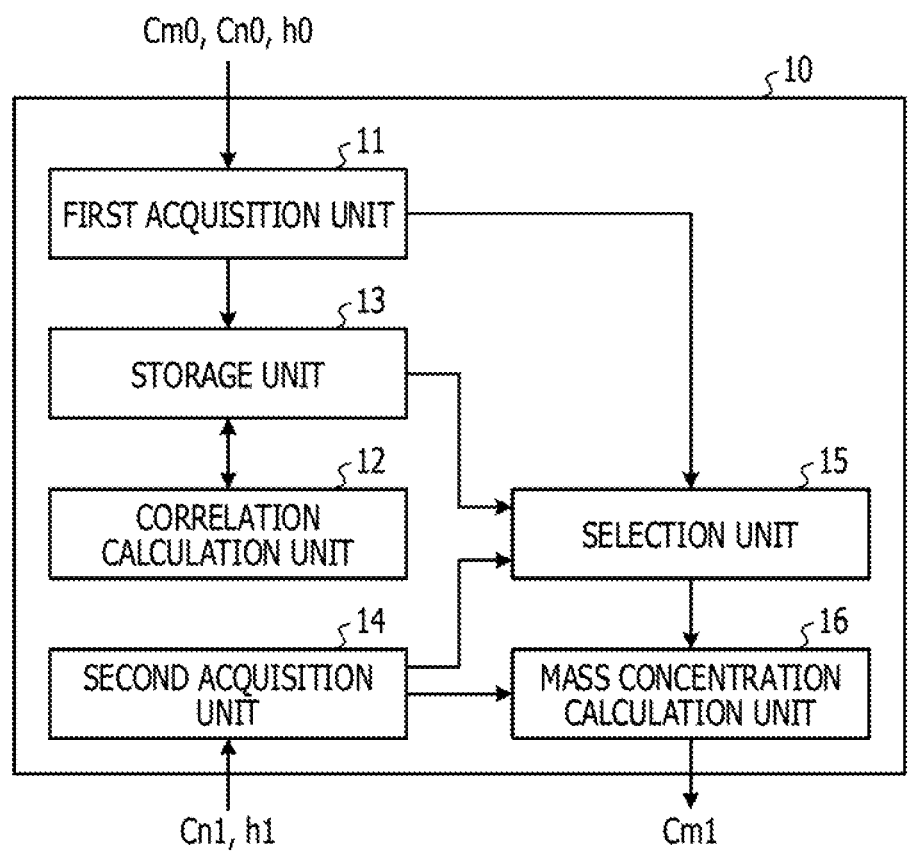
FIG. 3 is a functional block diagram of the server.

Specifically, as illustrated in FIG. 3, the CPU 111 executes the program, whereby the server 10 functions as a first acquisition unit 11, a correlation calculation unit 12, a second acquisition unit 14, a selection unit 15, and a mass concentration calculation unit 16.

The first acquisition unit 11 acquires, from the representative measurement station 30, the mass concentration Cm0, the number concentration Cn0, and the humidity h0 respectively measured by the mass concentration measuring instrument 31, the number concentration measuring instrument 32, and the hygrometer 33 in the representative measurement station 30, and stores them in the storage unit 13 such as the HDD 114.

The correlation calculation unit 12 calculates a correlation f(h) between a mass concentration Cm and a number concentration Cn with respect to the humidity h on the basis of the mass concentration Cm0, the number concentration Cn0, and the humidity h0 acquired over a predetermined period and stored in the storage unit 13, and stores the correlation f(h) in the storage unit 13. The correlation calculation unit 12 repeats the above-described processing for a period longer than the predetermined period. As a result, the storage unit 13 stores a plurality of correlations f1($h$) to fm(h) (m is an arbitrary positive integer). Details of a method of calculating the correlation f(h) will be described later.

The second acquisition unit 14 acquires, from the simple measurement station 20, the number concentration Cn1 and the humidity h1 respectively measured by the number concentration measuring instrument 21 and the hygrometer 22 in the simple measurement station 20, and outputs them to the mass concentration calculation unit 16.

The selection unit 15 selects two from the plurality of correlations f1($h$) to fm(h) stored in the storage unit 13 on the basis of the mass concentration Cm0, the number concentration Cn0, and the humidity h0 measured at a time close to a time when the number concentration Cn1 or the humidity h1 acquired by the second acquisition unit 14 is measured, among the mass concentrations Cm0, the number concentrations Cn0, and of the humidities h0 acquired by the first acquisition unit 11. The selection unit 15 outputs the two selected correlations to the mass concentration calculation unit 16.

The mass concentration calculation unit 16 calculates the mass concentration Cm1 in the simple measurement station 20 on the basis of the number concentration Cn1 and the humidity h1 input from the second acquisition unit 14, and the two correlations input from the selection unit 15.

(Correlation Calculation Method)

Figure 4:
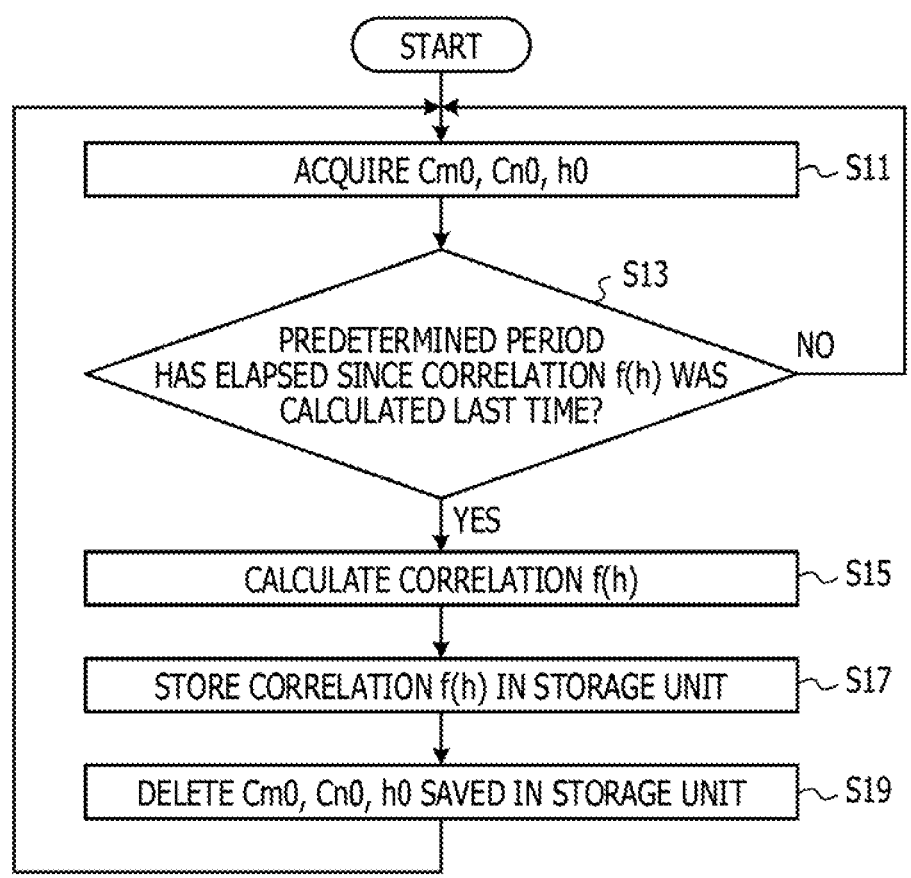
FIG. 4 is a flowchart illustrating a method of calculating a correlation.

Next, a method will be described of calculating the correlation between the mass concentration Cm and the number concentration Cn with respect to the humidity h. FIG. 4 is a flowchart illustrating the method of calculating the correlation.

As illustrated in FIG. 4, the first acquisition unit 11 acquires the mass concentration Cm0 every fixed time (for example, one hour), and acquires the number concentration Cn0 and the humidity h0 every shorter interval (for example, one minute) (step S11). The first acquisition unit 11 stores, in the storage unit 13, the mass concentration Cm0, the number concentration Cn0, and the humidity h0 measured at approximately the same time as one set. In a case where the measurement intervals are different from each other between the mass concentration Cm0, and the number concentration Cn0 and the humidity h0, the number concentration Cn0 and the humidity h0 measured at a time closest to a time when the mass concentration Cm0 is measured may be made as a set measured at approximately the same time. For a plurality of the number concentrations Cn0 and the humidities h0 measured within a measurement period from when the mass concentration Cm0 is measured until the next mass concentration Cm0 is measured, the mass concentration Cm0 most recently measured may be made as a set measured at approximately the same time. Alternatively, an average value of the plurality of number concentrations Cn0 and an average value of the plurality of humidities h0 measured within the measurement period, and the mass concentration Cm most recently measured may be made as one set measured at approximately the same time.

Next, the correlation calculation unit 12 determines whether or not a predetermined period (for example, one week) has elapsed since the correlation f(h) was calculated last time (step S13). In a case where the predetermined period has not elapsed (step S13: NO), the processing returns to step S11.

Figure 5:
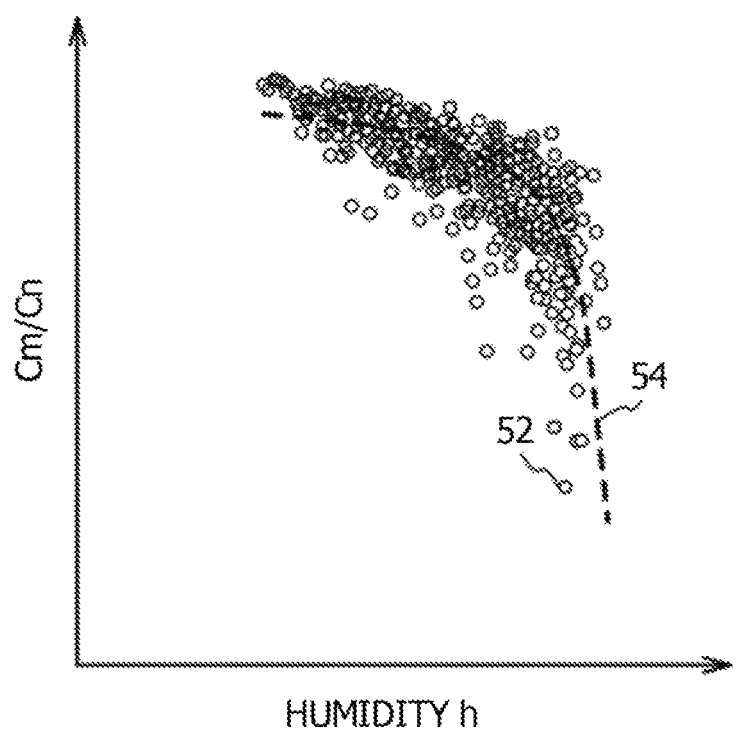
FIG. 5 is a diagram for explaining processing of FIG. 4.

In a case where the predetermined period has elapsed (step S13: YES), the correlation calculation unit 12 calculates the correlation f(h) on the basis of the mass concentration Cm0, the number concentration Cn0, and the humidity h0 collected in the predetermined period. (step S15). For example, the correlation calculation unit 12 calculates Cm/Cn (mass concentration/number concentration) from the mass concentration Cm0 and the number concentration Cn0 measured at approximately the same time. FIG. 5 is a diagram plotting a ratio (Cm/Cn) of the mass concentration to the number concentration with respect to the humidity h. In FIG. 5, a dot 52 indicates Cm/Cn with respect to the humidity h measured at approximately the same time. Since the humidity h changes depending on an environment of the representative measurement station 30, the dot 52 of Cm/Cn can be obtained for the various humidities h. The correlation calculation unit 12 calculates an approximate line 54 from a plurality of the dots 52. The correlation calculation unit 12 sets a function of the approximate line 54 as the correlation f(h).

Referring back to FIG. 4, the correlation calculation unit 12 saves the calculated correlation f(h) in the storage unit 13 (step S17). Then, the correlation calculation unit 12 deletes Cm0, Cn0, and h0 saved in the storage unit 13 within the predetermined period (step S19), and the processing returns to step S11. Note that, the correlation calculation unit 12 may save Cm0, Cn0, and h0 saved in the storage unit 13 as they are without deleting them.

The correlation calculation unit 12 repeats the processing of FIG. 4 for a period (for example, one month, four months, one year, several years, or the like) longer than the predetermined period (for example, one week). As a result, a plurality of the correlations f(h) is stored in the storage unit 13. For example, assuming that the predetermined period is one week and the correlation calculation unit 12 repeats the processing of FIG. 4 for one year, 52 correlations f1(h) to f52(h) are stored in the storage unit 13.

(Mass Concentration Calculation Method)

Figure 6:
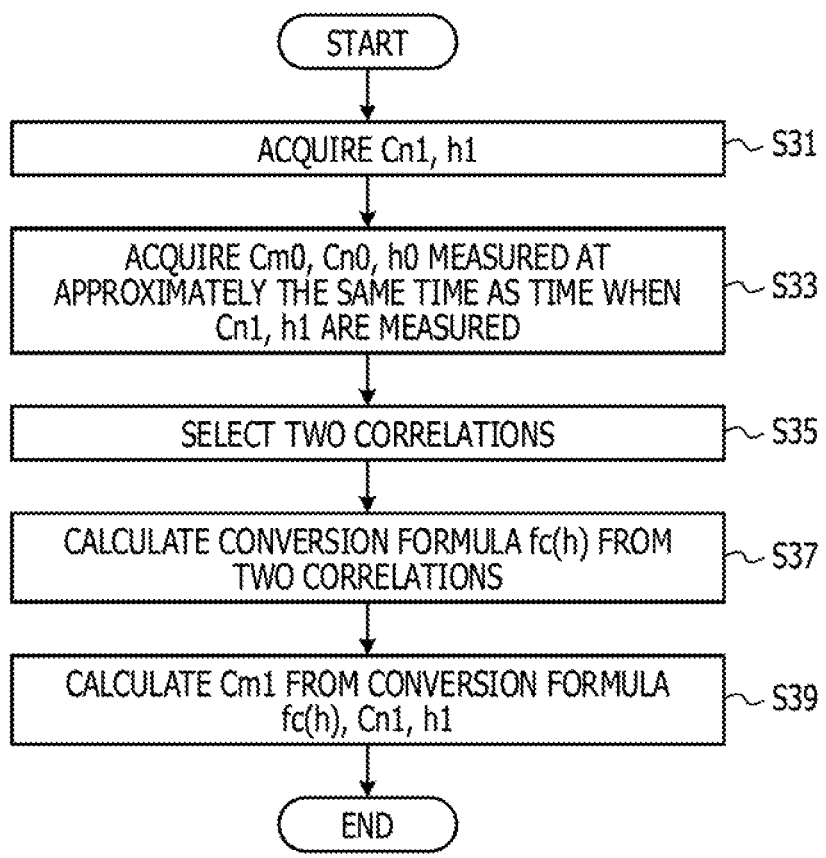
FIG. 6 is a flowchart illustrating a method of calculating a mass concentration.

Next, a method will be described of calculating the mass concentration Cm1 from the number concentration Cn1 and the humidity h1 respectively measured by the number concentration measuring instrument 21 and the hygrometer 22 in the simple measurement station 20. FIG. 6 is a flowchart illustrating a method of calculating the mass concentration.

In the processing of FIG. 6, first, the second acquisition unit 14 acquires, from the simple measurement station 20, the number concentration Cn1 and the humidity h1 respectively measured by the number concentration measuring instrument 21 and the hygrometer 22 in the simple measurement station 20 (step S31).

Next, the selection unit 15 acquires, from the first acquisition unit 11, the mass concentration Cm0, the number concentration Cn0, and the humidity h0 measured in the representative measurement station 30 at a time close to a time when the number concentration Cn1 or the humidity h1 is measured in the simple measurement station 20 (step S33). For example, the selection unit 15 acquires, from the first acquisition unit 11, the mass concentration Cm0, the number concentration Cn0, and the humidity h0 measured in the representative measurement station 30 at approximately the same time as the time when the number concentration Cn1 or the humidity h1 is measured in the simple measurement station 20. Here, in a case where a measurement interval of the number concentration Cn1 or the humidity h1 in the simple measurement station 20 and a measurement interval of the mass concentration Cm0, the number concentration Cn0, and the humidity h0 in the representative measurement station 30 are different from each other, it is sufficient that the mass concentration Cm0, the number concentration Cn0, and the humidity h0 measured at a time closest to the time when the number concentration Cn1 or the humidity h1 is measured are set as the mass concentration Cm0, the number concentration Cn0, and the humidity h0 measured in the representative measurement station 30 at approximately the same time. In addition, at this time, in a case where measurement intervals are different from each other between the mass concentration Cm0, and the number concentration Cn0 and the humidity h0 in the representative measurement station 30, a measurement time of the mass concentration Cm0 and a measurement time of the number concentration Cn0 and the humidity h0, which are regarded as being measured at approximately the same time, may be different from each other.

Figure 7A:
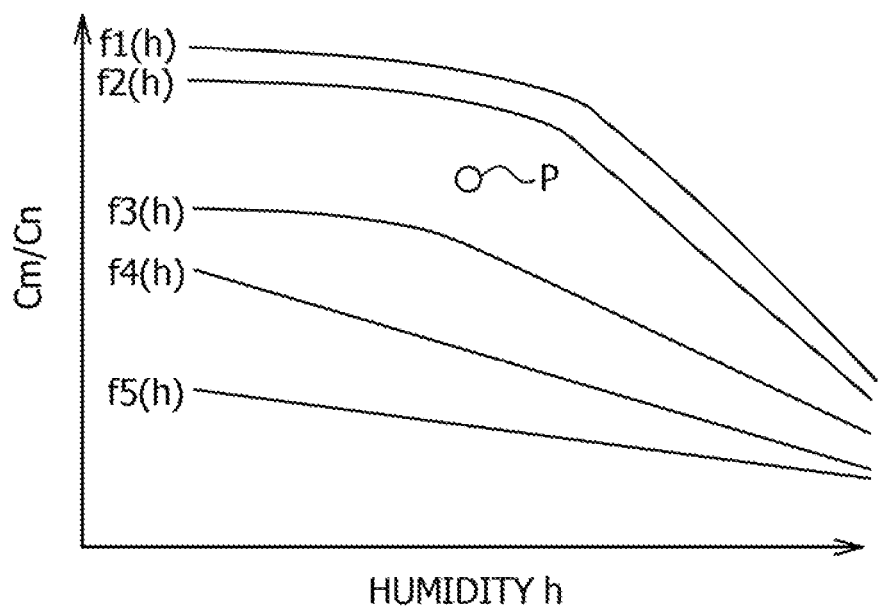
FIGS. 7A and 7B are diagrams (part 1) for explaining processing of FIG. 6.
Figure 7B:
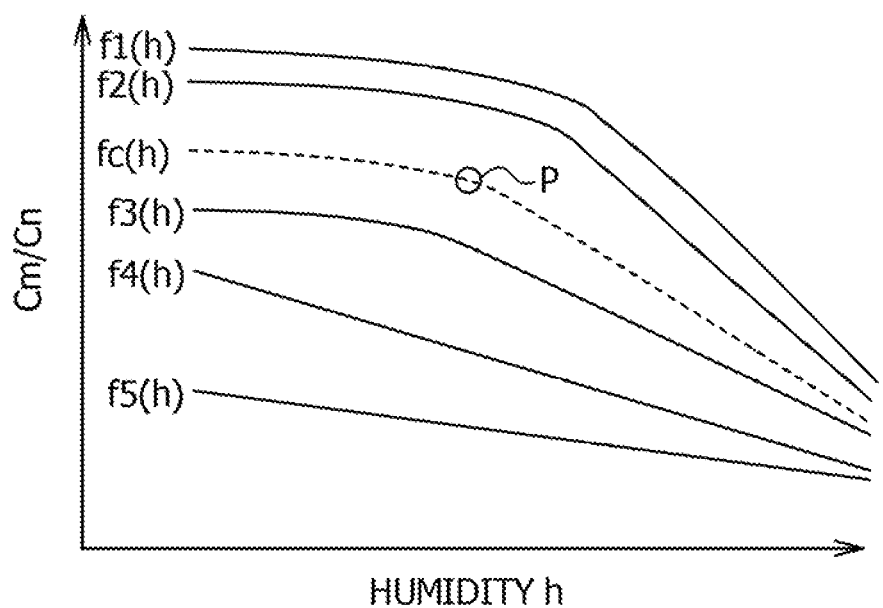

Next, the selection unit 15 selects two correlations from the plurality of correlations f(h) stored in the storage unit 13 on the basis of the mass concentration Cm0, the number concentration Cn0, and the humidity h0 acquired in step S33. (step S35). For example, as illustrated in FIG. 7A, it is assumed that the correlations f1(h) to f5(h) are stored in the storage unit 13. In FIG. 7A, the horizontal axis indicates the humidity h, and the vertical axis indicates a ratio of the mass concentration (Cm) to the number concentration (Cn). In addition, a point P is a plot of a ratio (Cm0/Cn0) of the mass concentration Cm0 to the number concentration Cn0 at the humidity h0 acquired in step S33. In this case, the selection unit 15 selects, for example, the correlations f2($h$) and f3($h$) closest to the point P as the two correlations. In addition, for example, the selection unit 15 may select the correlations f1($h$) and f2($h$) located above the point P as the two correlations, or may select the correlations f3($h$) and f4($h$) located below the point P as the two correlations. In addition, for example, the selection unit 15 may select the correlations f1($h$) and f3($h$) as the two correlations. A criterion for selecting the two correlations by the selection unit 15 can be set appropriately. Here, description will be made assuming that the selection unit 15 selects the correlations f2($h$) and f3($h$) as the two correlations.

Referring back to FIG. 6, the mass concentration calculation unit 16 calculates a conversion formula from the two selected correlations (step S37). For example, the selection unit 15 calculates a conversion formula fc(h) passing through the point P as indicated by a dotted line in FIG. 7B, by using interpolation such as linear interpolation. Note that, in a case where the point P is not located between the two selected correlations, the selection unit 15 is only required to calculate the conversion formula fc(h) passing through the point P by using extrapolation.

Figure 8:
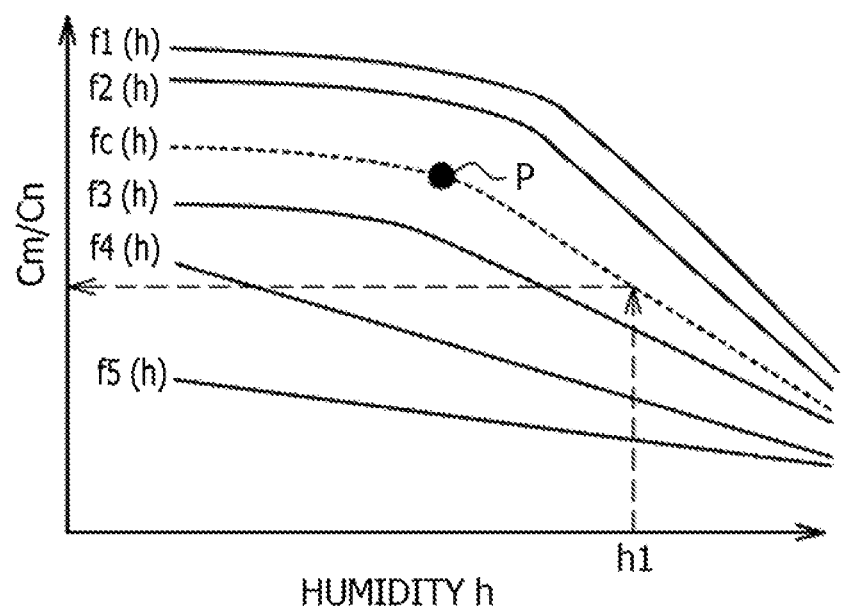
FIG. 8 is a diagram (part 2) for explaining the processing of FIG. 6.

Next, the mass concentration calculation unit 16 calculates the mass concentration Cm1 in the simple measurement station 20 on the basis of the calculated conversion formula fc(h), and the number concentration Cn1 and the humidity h1 acquired from the simple measurement station 20 (step S39). For example, as illustrated in FIG. 8, the humidity h1 in the simple measurement station 20 is assigned to the conversion formula fc(h), whereby a value is obtained of the mass concentration Cm/the number concentration Cn with respect to the humidity h1. The value is multiplied by Cn1, whereby the mass concentration Cm1 in the simple measurement station 20 is calculated (that is, Cm1=Cn1×fc(h1)).

Figure 9:
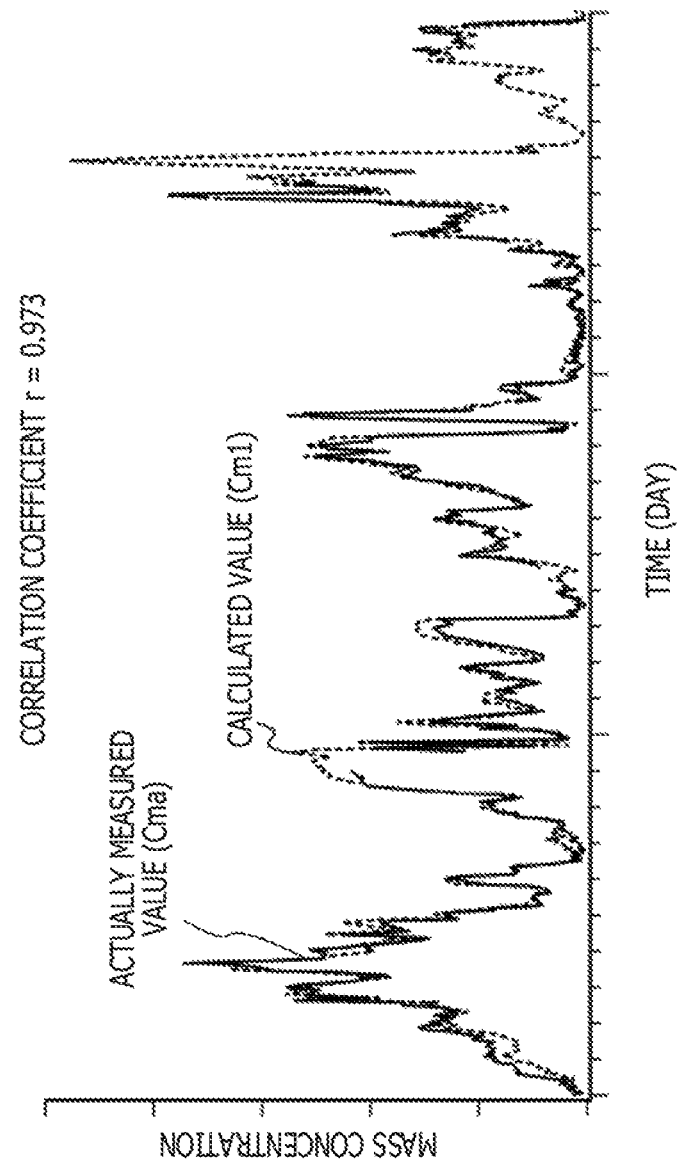
FIG. 9 is a diagram illustrating a calculated mass concentration Cm1 and an actually measured mass concentration Cma.

The mass concentration Cm1 calculated by the above-described mass concentration calculation method was compared with a mass concentration acquired by actual measurement. FIG. 9 is a diagram illustrating the calculated mass concentration Cm1 and an actually measured mass concentration Cma. In FIG. 9, the horizontal axis represents the time in days, and the vertical axis represents the mass concentration. In addition, the dotted line indicates the mass concentration Cm1 (calculated value) calculated by the above-described mass concentration calculation method, and the solid line indicates the mass concentration Cma (actually measured value) actually measured. As illustrated in FIG. 9, the calculated value has a very high correlation, a correlation coefficient r=0.973, with respect to the actually measured value, and it is indicated that the mass concentration calculation method according to the present embodiment is useful.

As described above in detail, the server 10 according to the present embodiment includes: the selection unit 15 that refers to the storage unit 13 that stores the plurality of correlations f(h) between the mass concentration Cm0 and the number concentration Cn0 of particles in a gas with respect to the humidity h0 of the gas, and selects two correlations from the plurality of correlations; and the mass concentration calculation unit 16 that calculates the mass concentration Cm1 of the particles in a gas on the basis of the two correlations selected, the number concentration Cn1 of the particles in the gas measured by the number concentration measuring instrument 21, and the humidity h1 of the gas measured by the hygrometer 22. As a result, measurement accuracy of the mass concentration Cm1 can be improved as compared with a case where the mass concentration Cm1 is calculated by always using the same function.

In addition, according to the present embodiment, the plurality of correlations f(h) is obtained by repeating, over a period (for example, one year) longer than a predetermined period (for example, one week), acquiring a relationship between the mass concentration Cm0 of particles in a gas measured by the mass concentration measuring instrument 31, the number concentration Cn0 of the particle in the gas measured by the number concentration measuring instrument 32, and the humidity h0 of the gas measured by the hygrometer 33, over the predetermined period, and calculating each of the correlations f(h) from the relationship in the predetermined period. As a result, for example, even in a case where the correlation between the mass concentration and the number concentration with respect to the humidity fluctuates due to the difference of season, the mass concentration can be calculated in consideration of the fluctuation, so that the measurement accuracy of the mass concentration Cm1 can be improved.

In addition, according to the present embodiment, the server 10 includes: the first acquisition unit 11 that acquires the mass concentration Cm0 of particles in a gas measured by the mass concentration measuring instrument 31, the number concentration Cn0 of the particle in the gas measured by the number concentration measuring instrument 32, and the humidity h0 of the gas measured by the hygrometer 33; and the correlation calculation unit 12 that calculates a correlation between the mass concentration and the number concentration with respect to the humidity on the basis of the mass concentration Cm0, the number concentration Cn0, and the humidity h0 acquired by the first acquisition unit 11, in which the storage unit 13 stores the correlation calculated by the correlation calculation unit 12. As a result, the correlation between the mass concentration and the number concentration with respect to the humidity can be accumulated in the storage unit 13.

In addition, according to the present embodiment, the mass concentration calculation unit 16 calculates the mass concentration Cm1 of particles in the gas on the basis of the conversion formula fc(h) calculated by the interpolation or the extrapolation using the two correlations. As a result, the mass concentration Cm1 can be easily calculated from the conversion formula fc(h), and the number concentration Cn1 and the humidity h0 measured in the simple measurement station 20.

In addition, according to the present embodiment, the selection unit 15 selects the two correlations on the basis of the mass concentration Cm0 of particles in a gas measured by the mass concentration measuring instrument 31, the number concentration Cn0 of the particles in the gas measured by the number concentration measuring instrument 32, and the humidity h0 of the gas measured by the hygrometer 33, at a time close to a time when the number concentration Cn1 of the particles in the gas is measured by the number concentration measuring instrument 21 or a time when the humidity h1 of the gas is measured by the hygrometer 22. As a result, since the correlation can be selected reflecting the environment, season, and the like when the number concentration Cn1 of the particles in the gas or the humidity h1 of the gas is measured in the simple measurement station 20, the measurement accuracy of the mass concentration Cm1 is improved.

Note that, in the above embodiment, the server 10 does not have to include the correlation calculation unit 12. In this case, the above-described mass concentration calculation method can be implemented by storing, in the storage unit 13 of the server 10 in advance, the plurality of correlations f(h) acquired by another measurement apparatus using the correlation calculation method or the like illustrated in FIG. 4.

In addition, in the above embodiment, in a case where a fixed period (for example, one year, three years, or the like) has elapsed, the server 10 may overwrite the correlation f(h) stored in the storage unit 13 in order from the oldest with a newly calculated correlation f(h). As a result, since the mass concentration Cm1 in the simple measurement station 20 can be calculated on the basis of the correlation f(h) reflecting a current state of the atmosphere (composition of the atmosphere), the measurement accuracy of the mass concentration Cm1 is improved.

Note that, in the above embodiment, a place is not particularly limited where there is the simple measurement station 20 that calculates the mass concentration Cm1 by using the correlation f(h) calculated by using the mass concentration Cm0, the number concentration Cn0, and the humidity h0 measured in the representative measurement station 30; however, the place is preferably within a predetermined range (for example, 10 km) from the representative measurement station 30.

Note that, in the above embodiment, for example, the mass concentration Cm1 in the simple measurement station 20 may be calculated by using the plurality of correlations f(h) calculated by using the mass concentration Cm0, the number concentration Cn0, and the humidity h0 measured in the representative measurement station 30 within the predetermined range (for example, 10 km) from the simple measurement station 20. In addition, in a case where there is no representative measurement station 30 in the predetermined range from the simple measurement station 20, the mass concentration Cm1 may be calculated by using the plurality of correlations f(h) calculated by using the mass concentration Cm0, the number concentration Cn0, and the humidity h0 measured in the representative measurement station 30 installed in a region having composition of the atmosphere similar to composition of the atmosphere in a region where the simple measurement station 20 is arranged.

In addition, in the above embodiment, the selection unit 15 selects the two correlations on the basis of the mass concentration Cm0 of the particles in the gas, the number concentration Cn0 of the particles in the gas, and the humidity h0 of the gas measured at approximately the same time as the time when the number concentration Cn1 of the particles in the gas or the humidity h1 of the gas is measured in the simple measurement station 20; however, this is not a limitation. For example, the selection unit 15 may select the two correlations on the basis of the mass concentration Cm0, the number concentration Cn0, and the humidity h0 measured in the same time zone as the time when the number concentration Cn1 or the humidity h1 is measured in the simple measurement station 20, within several days (for example, one day to three days). In addition, for example, the selection unit 15 may select the two correlations on the basis of the mass concentration Cm0, the number concentration Cn0, and the humidity h0 measured when the composition is similar to the composition of the atmosphere when the number concentration Cn1 or the humidity h1 is measured in the simple measurement station 20.

Note that, the above processing function can be implemented by a computer. In that case, a program is provided that describes a processing content of a function that the processing apparatus should have. The program is executed on the computer, whereby the above processing function is implemented on the computer. The program that describes the processing content can be recorded in a computer-readable recording medium (however, carrier waves are excluded).

In the case of distributing the program, for example, the program is sold in a form of a portable recording medium such as a digital versatile disc (DVD) or a compact disc read only memory (CD-ROM) in which the program is recorded. Alternatively, it is possible to store the program in a storage device of a server computer and transfer the program from the server computer to another computer via a network.

The computer that executes the program stores, for example, the program recorded in the portable recording medium or the program transferred from the server computer, in a storage device of the computer. Then, the computer reads the program from the storage device of the computer and executes processing according to the program. Note that, the computer can also read the program directly from the portable recording medium and execute processing according to the program. In addition, the computer can also execute processing sequentially according to the received program each time when the program is transferred from the server computer.

The embodiment described above is an example of a preferred embodiment of the present invention. However, this is not a limitation, and various modifications can be made without departing from the scope of the present invention.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing system comprising:
    a first measurement station including a first number concentration measuring instrument and a first hygrometer;
    a second measurement station including a mass concentration measuring instrument, a second number concentration measuring instrument and a second hygrometer; and
    a measurement apparatus coupled to the first measurement station and the second measurement station,
    the measurement apparatus is configured to:
        acquire, from the second measurement station, a second humidity of an air, a second mass concentration of particles in the gas and a second number concentration of the particles in the gas;
        calculate a plurality of correlations of the second mass concentration with respect to the second humidity and the second number concentration with respect to the second humidity;

store the plurality of correlations in a memory;

acquire, from the first measurement station, a first humidity of the air and a first number concentration of the particles in the gas;

select, from the memory, two correlations based on the first humidity and a measurement time of the first number concentration; and calculate a first mass concentration of particles in a gas based on the two correlations, the first number concentration and the first humidity.

2. The information processing system according to claim 1, wherein the plurality of correlations is obtained by repeating, over a period longer than a predetermined period, acquiring the second mass concentration, the second number concentration, and the second humidity over the predetermined period, and calculating each of the correlations from the second mass concentration, the second number concentration and the second humidity.

3. The information processing system according to claim 1, wherein the measurement apparatus is configured to calculate the first mass concentration of particles in the gas based on a conversion formula which is calculated by interpolation or extrapolation using the two correlations.

4. The information processing system according to claim 1, wherein the measurement apparatus is configured to select the two correlations based on the second mass concentration, the second number concentration, and the second humidity which are measured at a time close to a time when the first number concentration is measured by the first number concentration measuring instrument or a time when the first humidity is measured by the first hygrometer.

* * * * *